Figure 1:
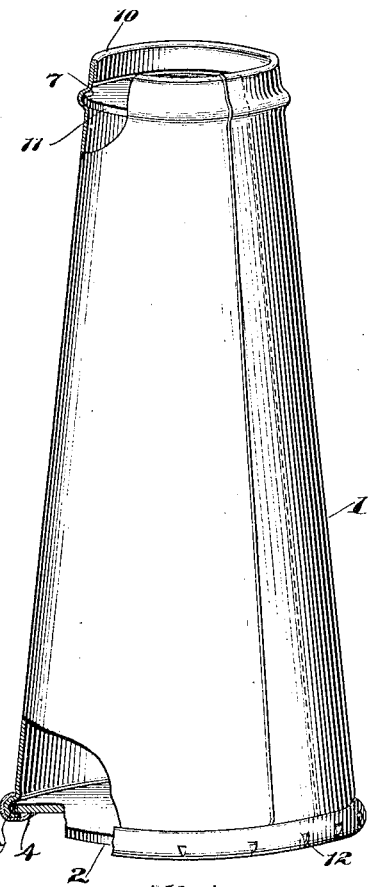

J. J. SHEA.
ASEPTIC BOTTLE.
APPLICATION FILED APR. 18, 1906.

904,095.

Patented Nov. 17, 1908.

2 SHEETS—SHEET 1.

Witnesses
Adolph C. Kaiser
Robert H. Kammler

Inventor
John J. Shea.
by Emery & Booth,
Atty's

J. J. SHEA.
ASEPTIC BOTTLE.
APPLICATION FILED APR. 18, 1906.
904,095.
Patented Nov. 17, 1908.
2 SHEETS—SHEET 2.
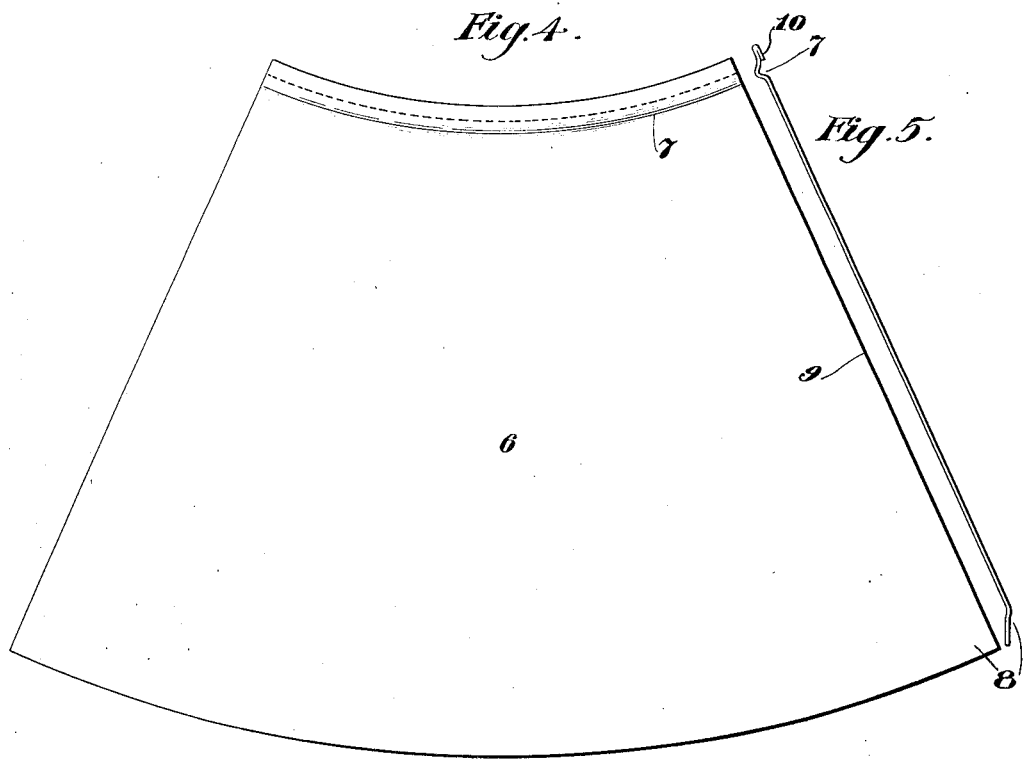
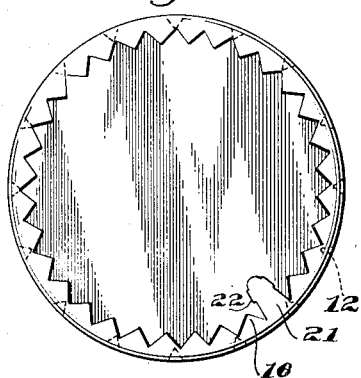
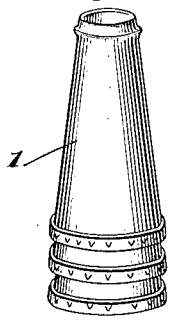
Witnesses
Adolph C. Kaiser
Robert H. Kammler
Inventor
John J. Shea
by Emery & Bootle
Atty's

UNITED STATES PATENT OFFICE.

JOHN J. SHEA, OF BEVERLY, MASSACHUSETTS.

ASEPTIC BOTTLE.

No. 904,095.            Specification of Letters Patent.         Patented Nov. 17, 1908.

Application filed April 18, 1906. Serial No. 312,358.

*To all whom it may concern:*

Be it known that I, JOHN J. SHEA, a citizen of the United States, residing at Beverly, in the county of Essex and State of Massachusetts, have invented an Improvement in Aseptic Bottles, of which the following description, in connection with the accompanying drawings, is a specification, like letters on the drawings representing like parts.

My invention relates to bottles and receptacles for milk, cream, or other liquids and aims to provide an aseptic fibrous structure adapted to be thrown away or destroyed after a single usage.

As at present constructed, receptacles for milk and the like are made of metal, glass or other silicious composition having considerable weight and are adapted to contain a fixed measure of liquid such as quarts, pints or half pints. In use these receptacles, which will be hereinafter referred to as milk bottles, whether used for milk or other liquids and whether of glass or metal, are filled, capped with the usual paper disk, and delivered to the consumer who may wash the bottle before returning it to the milkman. In any event these bottles have to be carried back, thoroughly washed and cleansed, often by the use of washing powders or swabs, in an attempt to remove all traces of old milk and other impurities before refilling for subsequent delivery.

As is well known milk bottles are a frequent source of disease, the improperly cleansed bottles and impregnated milk, or milk impregnated thereby, carrying the germs of contagious diseases such as typhoid, dysentery, etc., into the homes of numerous consumers, thereby to subject them to the possibilities of contagion from its usage. The ordinary milkman carries many hundred pounds' weight of bottles to and from the dairy daily, necessitating considerable labor of drivers and horses.

One object of my invention is to overcome these objections and defects by providing a receptacle that is extremely light in weight, of small cost, and that may be burned or thrown away after a single usage.

These and other objects and features of my invention however, will be best understood and appreciated by reference to the following description and accompanying drawings of a bottle, typifying one form of my invention and selected for purposes of illustration, its scope being more particularly pointed out in the appended claims.

Figure 2:
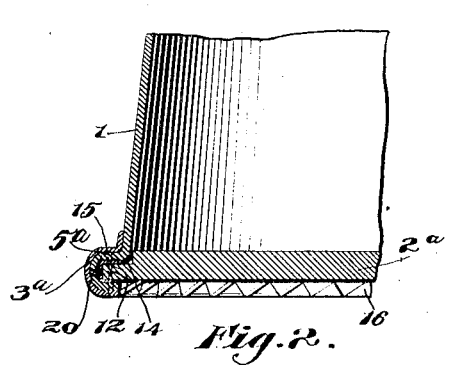
Figure 3:
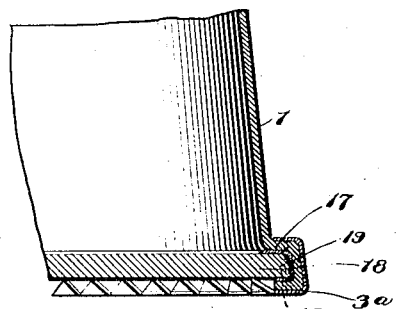

Referring to the drawings:—Figure 1 is a perspective and partial section of a bottle selected for representation. Figs. 2 and 3, enlarged sectional details of bottles employing modified forms of bottom disks and the clamping rings therefor. Figs. 4 and 5, plan and edge views respectively of the died out and rolled blank from which the bottle is made. Fig. 6 is a plan and partial section of the bottle modified disks represented in Figs. 2 and 3 in place upon the bottle, and Figs. 7 and 8 are elevations representing the manner in which the cones and disks are shipped to the dealer.

In the embodiment of my invention herein illustrated (Figs. 1 and 3) a milk receptacle or bottle is provided comprising a truncated hollow cone, 1, of any fibrous pliable material as cardboard, which is made impervious to the liquid it is to contain by immersion in a suitable coating composition. In the present instance the material is waterproofed by coating with paraffin, since it is desirable that the coating substance be non injurious to the milk and to the consumer. The bottom of the cone, 1, receives a plug or disk, 2, made of wood or fibrous material similarly waterproofed and retained within said cone, 1, to constitute a bottom therefor, by means of an outer preferably metallic retaining ring, 3, having its lower edge, 4, inturned to clamp the sides of the cone firmly against the bottom disk. To aid in effecting a liquid tight joint between the cone and its bottom, a packing ring or washer, 5, of asbestos or other similar compressible material, is interposed between the edge of the disk and said cone, the bottom retaining ring, 3, compressing said packing ring as the latter is forcibly clamped into and secured in place. This cone, 1, is formed from a blank, 6, died out by suitable machinery to a shape represented by Fig. 4 and is subsequently rolled to form a semicircular groove, 7, or depression adjacent its upper end and to form a flange or bend, 8, at its lower end. This blank, 6, is then rolled up or shaped upon a former into cone or bottle shape, its lateral edges, 9, secured together by suitable means at the lap, and the upper edge inturned and creased as at 10. The retaining ring, 3, is then dropped over the small end upon the out turned flange, 8, the disk 2, inserted in the bottom to bear against the inner periphery of the cone at the bend of said flange, and the ring clamped against it, the washer, 5, being inserted with said disk. When said disk, washer, cone sides, and ring have been properly positioned the flange, 8, may be bent inwards and upwards to lock the parts together. When formed in this manner the semicircular groove, 7, to which reference has been made, presents at its lower edge a ledge to receive the usual paper diaphragm or cap, 11, the edge of which fits in said groove and is retained thereby. This groove being indented forms a circular protuberance or ridge around the top of the bottle, affording a convenient hold for the fingers in handling in the usual way. For integrally uniting the retaining ring and cone sides, the ring, 3, is provided with incut teeth or prongs, 12 (Fig. 1) which engage and penetrate the sides of the cone below the disk 3, thus locking the parts together. The blanks, 6, are of different sizes corresponding to the size of the bottle required, whether quarts, pints, half pints, etc.

In the embodiment of my invention illustrated by Fig. 2, the disk, 2ª, is provided with a circumferential groove or rabbet, 14, to receive an angular packing ring 5ª, and the sides of the cone. The retaining ring, 3ª, in this instance, having an inwardly turned flange, 15, adapted to fit over the rabbeted edge of said disk, 2ª, and shape the sides of the cone thereto, or a suitable shoulder 20 may be formed in rolling the blank. This ring 3ª, is also provided with teeth or prongs, 12, to secure the parts together. When the ring 3ª, is forced into its seat or rabbet, 14, its lower edge is inturned, to rigidly secure the parts together. As herein shown this edge is provided with lips or serrations, 16, to facilitate bending it inward.

In the modification illustrated by Fig. 3, the bottom of the blank is rolled or formed with a shoulder, 17, to receive the cylindrical disk, 18, and washer, 19, the ring 3ª, being similar in construction to that just described, the bottom plans being shown in Fig. 6. Any of the bottles as thus built up may be subjected to a second immersion in paraffin or said waterproofing may be deferred until the blanks have been rolled and the disks or bottom inserted and secured.

As supplied to the trade the blanks and disks are sent in bulk or the blanks are formed with cones suitably united at their edges and nested as illustrated in Fig. 7, these "knock down" receptacles taking up little room and preserving the shape of the cones by the greater strength of their compact and nested arrangement. The disks 3, 3ª, or 18, are shipped in rolls, 20, as shown in Fig. 8.

As these bottles are preferably made of cardboard and paraffin, they afford an excellent fuel or fire kindler after emptying and are advantageously burned, thereby destroying all disease germs in case the milk with which they were filled was impregnated, or the bottles infected.

These bottles are of little cost and are designed to be thrown away, if not burned, thus avoiding all labor of washing, cleansing, returning to the dealer for refilling, etc., resulting in a saving of the horses and drivers by avoiding hauling and handling of empty bottles and the time required in collecting. Their insignificant weight permits carrying large quantities of milk and where bottles are expressed there is a saving of return charges and obviously there will be no breakage or consequent particles of glass in the milk or elsewhere.

As most of the impure milk is produced by infection from dirty cans and bottles, the use of bottles of the type herein described diminishes the spread of disease and contagion, and, as each bottle is strictly aseptic, there will be less necessity to ice the bottles for preserving the milk, the use of ice at present being essential to keep the temperature low to prevent growth or increase of germs and putrefaction which usually arises through infected and impregnated glass bottles and cans is avoided. Furthermore much of the milk now lost by infection could be saved by eliminating the cause.

My invention provides an aseptic substitute for the disease breeding glass bottles, its use aiming and tending to prevent epidemics of typhoid and dysentery and to save the lives of countless children and infants from the ravages of milk born diseases, and is therefore strictly hygienic.

While in the embodiment of my invention herein illustrated I have described and shown a receptacle or bottle for milk, obviously, my invention is not limited thereto.

Claims.

1. As a new article of manufacture, a truncated hollow cone of flexible material having a peripheral groove at one end, a flanged portion at one end to receive a disk provided with a rabbeted edge, packing means therefor, and an exterior retaining ring provided at its inner side with a peripheral recess shaped to coöperate with the edge of said disk and to bend and clamp the adjacent wall of the cone over and upon the packing means and edge of said disk and provided with an inturned flange to retain the disk in position.

2. As a new article of manufacture, a truncated hollow cone of flexible material having a peripheral groove at its upper end, a bottom disk having a circumferential rabbet at its edge and an exterior retaining ring provided at its inner side with a peripheral recess shaped to coöperate with the rabbeted edge of said disk and to bend and clamp the adjacent side wall of the cone over and upon said edge and having an inturned flange to retain the disk therein, substantially as shown and described.

3. As a new article of manufacture, a composite aseptic receptacle for milk and the like comprising a body of infrangible material provided with a groove at one end, a laterally extended portion at one end, an independent bottom disk of like material, packing means therefor, receptacle encircling adjustable means to compress the top of the bottom disk against said packing means and laterally extended portion and lock the disk in position.

4. As a new article of manufacture, a hollow frusto-conical body of flexible, non-absorbent material provided with an internal groove near one end, a laterally extended portion near one end, adapted to be nested with other similarly shaped bodies, a bottom disk, packing means therefor adapted to be inserted in the flanged end, and receptacle encircling adjustable means to compress the bottom disk against the packing means and laterally extended portion and lock the disk in position.

5. As a new article of manufacture, a receptacle for fluids comprising a hollow truncated cone of flexible material having a groove near one end, a flanged bottom, a disk adapted to enter the flanged end of said cone, and an exterior retaining ring provided with a plurality of inwardly projecting prongs adapted to pierce the side wall of said cone and the edge of said disk for retaining the latter in place.

6. As a new article of manufacture, a receptacle comprising a hollow truncated cone of flexible material having a groove near one end, a disk for closing the bottom opening therein and a removable exterior retaining ring provided with a plurality of inwardly projecting prongs to engage the walls of the cone and with a plurality of saw teeth adapted to be bent inward to engage the bottom of said disk for forcing the latter against the side of said cone to lock the disk in place.

7. As a new article of manufacture a truncated hollow cone of flexible non-absorbent material having a peripheral groove at its upper end, a bottom disk having a circumferential rabbet at its edge, and an exterior retaining ring provided at its inner side with a peripheral recess shaped to coöperate with the rabbeted edge of said disk and to bend and clamp the adjacent side wall of the cone over and upon said edge and having an inturned flange to retain the disk thereon, and inwardly projecting spurs to enter the sides of the cone to secure said ring to the sides and to the bottom disk.

In testimony whereof, I have signed my name to this specification, in the presence of two subscribing witnesses.

JOHN J. SHEA.

Witnesses:
SIDNEY F. SMITH,
EVERETT S. EMERY.